United States Patent
Hoarau et al.

(10) Patent No.: US 9,632,732 B2
(45) Date of Patent: Apr. 25, 2017

(54) PRINT PRODUCT REPRESENTATION

(75) Inventors: Eric Hoarau, San Francisco, CA (US); Ingeborg Tasti, San Mateo, CA (US); John Ludd Recker, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/391,211

(22) PCT Filed: Jun. 15, 2012

(86) PCT No.: PCT/US2012/042691
§ 371 (c)(1),
(2), (4) Date: Oct. 8, 2014

(87) PCT Pub. No.: WO2013/187914
PCT Pub. Date: Dec. 19, 2013

(65) Prior Publication Data
US 2015/0098111 A1    Apr. 9, 2015

(51) Int. Cl.
*G06F 15/00* (2006.01)
*G06F 3/12* (2006.01)
*G06F 3/14* (2006.01)
*G06T 17/10* (2006.01)
*G06T 19/20* (2011.01)

(52) U.S. Cl.
CPC .............. *G06F 3/12* (2013.01); *G06F 3/1208* (2013.01); *G06F 3/1256* (2013.01); *G06F 3/1285* (2013.01); *G06F 3/1287* (2013.01); *G06F 3/14* (2013.01); *G06T 17/10* (2013.01); *G06T 19/20* (2013.01)

(58) Field of Classification Search
None
See application file for complete search history.

(56) References Cited

U.S. PATENT DOCUMENTS

| | | | | |
|---|---|---|---|---|
| 5,886,342 A * | 3/1999 | Matsui | .................... | G01B 11/25 250/208.1 |
| 7,149,596 B2 | 12/2006 | Berger et al. | | |
| 8,155,774 B2 | 4/2012 | Wu et al. | | |
| 8,565,909 B2 * | 10/2013 | Bickel | ................. | B29C 67/0088 358/474 |
| 2004/0130744 A1 | 7/2004 | Wu et al. | | |
| 2005/0267657 A1 * | 12/2005 | Devdhar | ............ | G06K 9/00208 701/33.4 |

(Continued)

OTHER PUBLICATIONS

Slavkovsky, Feasibility study for teaching geometry and other topics using three-dimensional printers. Proposed Thesis in the Field of Mathematics for Teaching, Jul. 27, 2011 12 pages.

*Primary Examiner* — Helen Q Zong
(74) *Attorney, Agent, or Firm* — Dicke, Billig & Czaja, PLLC (Pat)

(57) ABSTRACT

A system includes a product descriptor module and a display module. The product descriptor module provides access to a three-dimensional geometric model for a print product, receives dimensional information regarding the print product, and calibrates the three-dimensional model of the print product based on the dimensional information. The display module displays a three-dimensional graphical representation of the print product based on at least the calibrated three-dimensional model.

23 Claims, 8 Drawing Sheets

(56) References Cited

U.S. PATENT DOCUMENTS

| | | | |
|---|---|---|---|
| 2006/0116901 A1* | 6/2006 | Ookubo | G06Q 30/02 705/1.1 |
| 2007/0240042 A1 | 10/2007 | Sato | |
| 2009/0303507 A1 | 12/2009 | Abeloe | |
| 2010/0100214 A1 | 4/2010 | MacDonald | |
| 2010/0198563 A1* | 8/2010 | Plewe | G06F 17/5004 703/1 |
| 2010/0201684 A1* | 8/2010 | Yadav | G06F 17/50 345/420 |
| 2010/0214598 A1 | 8/2010 | Hoppenot et al. | |
| 2011/0013203 A1* | 1/2011 | Grosz | G06F 17/3028 358/1.2 |
| 2011/0286040 A1* | 11/2011 | Seto | G06T 11/60 358/1.15 |
| 2012/0105431 A1* | 5/2012 | Williams | G06F 3/1208 345/419 |
| 2013/0077113 A1* | 3/2013 | Rolleston | G06F 3/1208 358/1.13 |

\* cited by examiner

PRINT PRODUCT REPRESENTATION

BACKGROUND

Electronic communication has revolutionized the printing industry. Buyers of printing services are able to submit their print jobs electronically, such as through the internet, to a print service provider. In many instances, the print service provider advertises their print product offerings on a web site, through which the buyer also can obtain printing services.

DETAILED DESCRIPTION

In the following detailed description, reference is made to the accompanying drawings which form a part hereof, and in which is shown by way of illustration specific embodiments and examples of the present disclosure, which may be practiced. In this regard, directional terminology, such as "top," "bottom," "front," "back," "leading," "trailing," etc., is used with reference to the orientation of the Figure(s) being described. Because components of examples and embodiments can be positioned in a number of different orientations, the directional terminology is used for purposes of illustration and is in no way limiting. It is to be understood that other examples and embodiments may be utilized and structural or logical changes may be made without departing from the scope of the present disclosure. The following detailed description, therefore, is not to be taken in a limiting sense.

At least some examples of the present disclosure enable a print service provider to display, to a buyer, a highly accurate 3D representation of a print product after the print service provider calibrates a 3D geometric model (of the print product) supplied by a print model provider. In one example, dimensional information from an actual physical product (produced by the print service provider) is used to calibrate and adjust the 3D geometric model to increase the accuracy by which a 3D graphic representation (accessible by a buyer) advertises the capabilities of the print service provider. Accordingly, a print service provider is able to better differentiate themselves among their competition by providing more accurate 3D representations of how a buyer's product will appear if produced by that particular print service provider. This enhanced communication regarding the capabilities of the print service provider will likely increase buyer satisfaction as the final product will more closely correspond to the 3D representation viewed by the buyer.

Moreover, in one aspect, despite the variability that typically occurs among print products (even of the same type) because of the particular processes and materials used by each print service provider, via at least some of the examples of the present disclosure, a print service provider is able to eliminate or greatly reduce the gap between what the potential buyer sees for a print product on a web site of the print service provider and what the potential buyer actually receives as their print product.

Moreover, at least some of the examples of the present disclosure enable a print service provider to quickly and effectively communicate their product offerings to a buyer without employing traditional complex modeling techniques, which are expensive and time intensive because such techniques involve vast computing resources and too many human resources.

However, examples of the present disclosure provide efficient and effective modeling solutions via minimizing the use of computing resources and human resources while enhancing the level and type of information provided to a buyer regarding their print product purchases.

These examples, and additional examples, are described in association with FIGS. 1-15.

Figure 1:
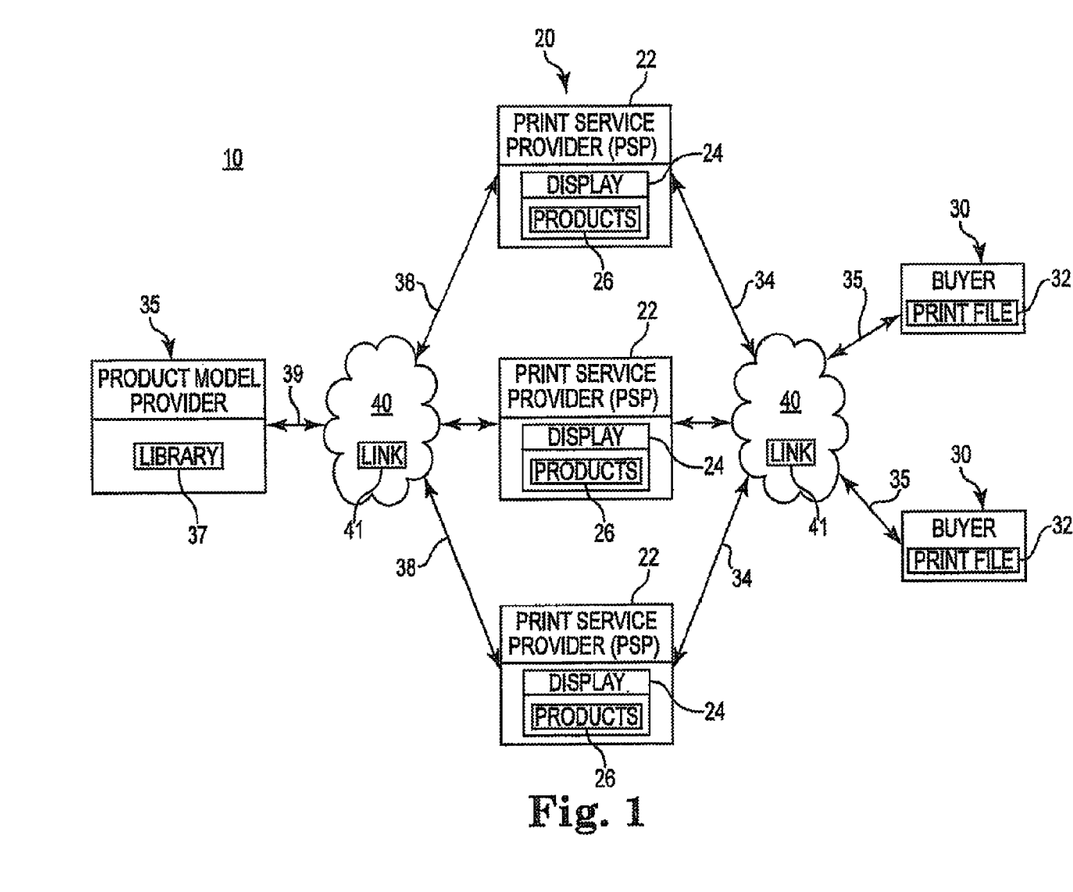
FIG. 1 is a block diagram schematically illustrating a print product visualization system, according to one example of the present disclosure.

FIG. 1 is a diagram schematically illustrating a print product visualization system 10, according to one example of the present disclosure. As shown in FIG. 1, the system 10 includes a plurality of print service providers 22, buyers 30, and a product model provider 35. Buyers 30 communicate with print service providers. 22 electronically via the cloud 40, along the respective communication paths 34, 35. In one example, the cloud 40 represents a network communication link 41 such as the internet, other network-based communication protocols, mobile telecommunication networks, local area networks (LAN), wide area networks (WAN), etc. Meanwhile, product model provider 35 communicates with the multiple print service providers 22 electronically via the cloud 40, along the respective communication paths 38, 39. It will be understood that cloud 40 is depicted in separate portions in FIG. 1 strictly for illustrative purposes, and that cloud 40 generally represents a common computing and communication environment.

In general terms, as shown in FIG. 1, print product visualization system 10 provides for an environment in which print service providers 22 provide a display 24 of product offerings 26 viewable and purchasable by buyers 30. In one example, the displayed product offerings 26 comprise three-dimensional (3D) graphical representations of the print products offered by print service provider 22, thereby allowing a buyer to visualize how their finished product will appear. In one aspect, the product offerings 26 comprise a print product (e.g. a case bound book, a perfect bound book, etc.) in which a content of the buyer's print file 32 can be embodied. Accordingly, print service providers 22 endeavor to provide a highly accurate representation of the print product that would be provided to the buyer.

In one aspect, print service providers 22 obtain three-dimensional models of the print products from a library 37 of a product model provider 35. In order to maximize accuracy in the three-dimensional graphical representation of the print products 26, the print service provider 22 calibrates the three-dimensional models obtained from the product model provider 35. In one example, the calibration of a three-dimensional model of a print product 26 is performed by each print service provider 22 according to physical measurements of actual products produced by the respective print service provider 22. After calibration and incorporating the buyer's content, a highly accurate three-dimensional graphical representation of the print products 26 (offered by each print service provider 22) is provided at display 24 for viewing and/purchase by buyers 30.

In one example, buyer 30 participates in system 10 via a computer (e.g. laptop, desktop, etc.), a mobile computing device (e.g. smartphone, tablet, etc.), and like devices capable of communicating via cloud 40. The buyer 30 can be an individual consumer, a business or other entity. For examples, in some instances, buyer 30 is another print service provider that seeks to outsource portions of a print job for which the particular print service provider lacks the appropriate type of resources to perform and/or for which the particular print service provider does not have the capacity to handle in a particular time frame. It will be further understood that system 10 can handle multiple buyers 30 operating in parallel with each buyer 30 independently making their own inquiries (regarding print products 26) to the multiple print service providers 22.

In one example, a print file 32 includes an electronic file of content to be printed along with some parameters regarding a type of printing, print medium, formatting, finishing options, etc.

In one example, print service provider 22 includes an entity owning and/or operating a print shop having printers and related devices for producing a print product requested by buyer 30. In one aspect, the print services include printing, copying, finishing, assembly, delivery, shipping and related tasks. In one aspect, print service provider 22 operates a publically accessible portal, such as a web site and through which the buyer 30 and print service providers 22 can communicate with each other via the cloud 40.

In one example, product model provider 35 is a third party relative to buyer 30 and print service providers 22 and does not provide its own printing services. In another example, the print model provider 35 also provides printing services in addition to their role in system 10.

In one example, a print product includes a book, magazine, booklet or pamphlet while in some other examples, a print product includes a container (e.g. a box), signage, beverage containers (e.g. a bottle), etc. Accordingly, in at least some examples of the present disclosure, a print product is not strictly limited to books and similar articles. In at least some instances, the print product exhibits some three-dimensionality in form.

Figure 2A:
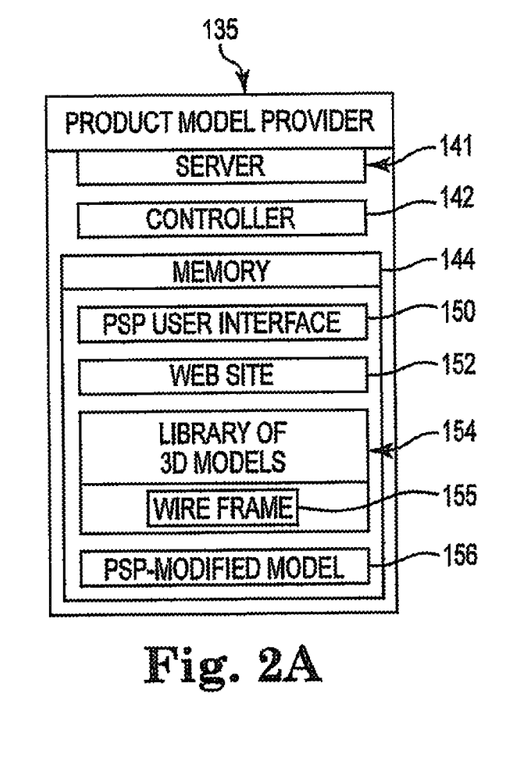
FIG. 2A is a block diagram schematically illustrating a server of product model provider, according to one example of the present disclosure.

FIG. 2A is a block diagram of a server 141 of product model provider 135, according to an example of the present disclosure. In one example, product model provider 135 comprises at least substantially the same features and attributes as product model provider 35, previously described in association with FIG. 1.

As shown in FIG. 2A, in one example the product model provider 135 comprises server 141, which includes a controller 142 and memory 144. In one example, memory 144 stores user interface 150, web site 152, a library of three-dimensional geometric models 154 and a modified print product model function 156.

In one embodiment, controller 142 comprises at least one processor and associated memories to generate control signals directing the operation of system 10 of FIG. 1 and/or server 141 of FIG. 2A. In particular, in response to or based upon commands received via a user interface 150 and/or machine readable instructions (including software) contained in the memory 144 associated with controller 142, controller 142 generates control signals directing operation of server 141 shown in FIG. 2A. In one example, controller 142 is embodied in a general purpose computer.

For purposes of this application, in reference to the controller 142, the term "processor" shall mean a presently developed or future developed processor that executes sequences of machine readable instructions (such as but not limited to software) contained in a memory. Execution of the sequences of machine readable instructions causes the processor to perform actions, such as operating server 141 to provide printing services by print service provider 22 and/or product model provider 35 in the manner described in the examples of the present disclosure. The machine readable instructions may be loaded in a random access memory (RAM) for execution by the processor from their stored location in a read only memory (ROM), a mass storage device, or some other persistent storage or non-volatile form of memory, as represented by memory 144. In one example, memory 144 comprises a computer readable medium providing non-volatile storage of the machine readable instructions executable by a process of controller 142. In other examples, hard wired circuitry may be used in place of or in combination with machine readable instructions (including software) to implement the functions described. For example, controller 142 may be embodied as part of at least one application-specific integrated circuit (ASIC). Unless otherwise specifically noted, the controller 142 is not limited to any specific combination of hardware circuitry and machine readable instructions (including software), nor limited to any particular source for the machine readable instructions executed by the controller 142.

In one example, user interface 150 comprises a graphical user interface or other display that provides for the simultaneous display, activation, and/or operation of the various components, functions, features, and modules of server 141, described in association with at least FIG. 2A, and/or operation of the various components, functions, features, and modules of user interface 200 or 350, as later described in association with at least FIG. 3A or FIG. 6, respectively. Moreover, it will be understood that the features, functions, modules, and components of the server 141 and user interface 150 can be arranged in different forms and groupings, and therefore each of server 141 and user interface 150 are not strictly limited to the particular arrangement or groupings of functions illustrated in FIG. 2A. Similarly, while described later, it will be further understood that the features, functions, modules, and components of the example user interface 200 (FIG. 3A) or the example user interface 350 (FIG. 6) can be arranged in different forms and groupings, and therefore each user interface 200, 350 is not strictly limited to the particular arrangement or groupings of functions illustrated in FIGS. 3A and 6, respectively.

While in one example the components and functions of a product model provider 135 are at least partially embodied in a server (e.g. server 141) as described in association with FIG. 2A, it will be understood that in another example of the present disclosure, at least some of the components and/of functions of the product model provider 135 (and/or of a print service provider) are provided via the cloud 40 (FIG. 1) via cloud computing resources provided via: (1) infrastructure as a service (IaaS); (2) platform as a service (PaaS); (3) software as a service (SaaS); or (4) a hybrid form of cloud-based services.

With reference to FIG. 2A, in one example web site 152 comprises a site operated by print model provider 35 and accessible by at least print service providers 22, through which user interface 150 can be accessed. However, in other examples, user interface 150 is supplied via CD-ROM or communication protocols and/or environments other than web site 152.

In one example, via user interface 150 and/or web site 152, product model provider 135 enables access to a library of 3D graphical geometric models 154. In one example, at least some of the 3D geometric models comprise a wire frame model 155 having an array lines and points that correspond to and represent the shape and dimensions of a particular type and size of a print product. In one aspect, at least some of the 3D geometric models 154 are content-free or blank in that no text or graphics are present on the pages or covers. In another aspect, at least some of the 3D geometric models 154 include portrayal of sample content that is not specific to the potential buyer.

As previously mentioned, via user interface 150 a print service provider 22 accesses the library and selects 3D geometric models that generally match print products offered by print service provider 22 (to buyers 30). After calibration relative to actual physical products of the print service providers 22, the user interface 150 enables buyers 30 to preview highly accurate models of print product offered by the print service providers 22. In some instances, product model provider 135 saves modified models 156 on behalf of the particular print service provider 22 for their re-use and to enable convenient and secure storage of calibrated print product offerings.

Figure 2B:
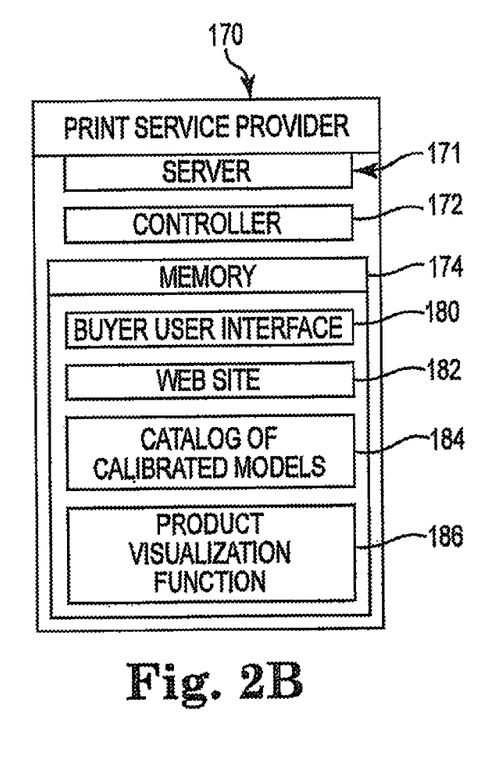
FIG. 2B is a block diagram schematically illustrating a server of a print service provider, according to one example of the present disclosure.

FIG. 2B is a block diagram of a print service provider 170, according to an example of the present disclosure. In one example, print service provider 170 comprises at least substantially the same features and attributes as print service provider 22, previously described in association with FIG. 1.

As shown in FIG. 2B, in one example the print service provider 170 comprises a server 171, which includes controller 172 and memory 174. In general terms, controller 172 and memory 174 comprise at least substantially the same features and attributes as controller 142 and memory 144 (as previously described and illustrated in association with FIG. 2A) except for supporting and directing operations of server 171 (FIG. 2B) instead of server 141 (FIG. 2A).

In one example, as shown in FIG. 2B memory 174 stores a buyer user interface 180, web site 182, a catalog 184 of calibrated models, and a product visualization function 186. In one example, buyer user interface 180 comprises at least substantially the same features and attributes as buyer user interface 800, as later described in association with FIG. 13.

In one aspect, web site 182 comprises a site operated by a print service provider 22 and which is accessible by buyers 30, through which user interface 180 can be accessed. However, in other examples, user interface 180 is supplied to buyers 30 via CD-ROM or communication protocols and channels other than web site 182.

In one example, via user interface 180 and/or web site 182, print service provider 170 enables access (for buyer 30) to the catalog of calibrated 3D print product models 184 offered by print service provider 170. As previously mentioned, a buyer 30 accesses the catalog and selects a print product to be previewed by buyers 30. After the buyer 30 makes their selection and uploads their content (e.g. print file 32 in FIG. 1) via web site 182, via product visualization function 186, print service provider 170 displays a product image in the form of a 3D graphical representation corresponding to the print product that would be supplied to buyer 30, if buyer 30 were to authorize the work.

Figure 3A:
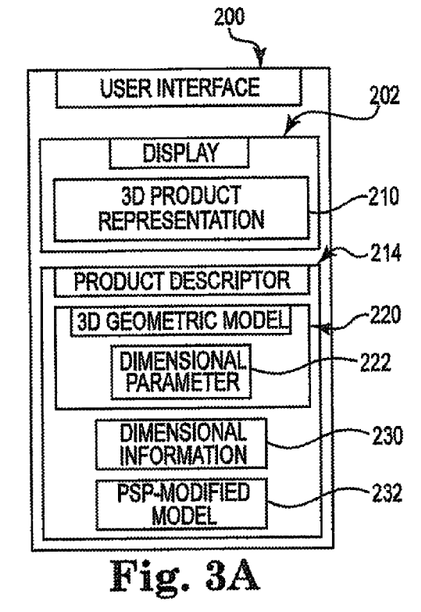
FIG. 3A is a block diagram schematically illustrating a user interface accessible by a print service provider, according to one example of the present disclosure.

FIG. 3A is a block diagram of a user interface 200 in a print product visualization system, according to one example of the present disclosure. In one example, user interface 200 includes at least substantially the same features and attributes as user interface 150, as previously described and illustrated in association with FIG. 2A. In general terms, user interface 200 is operated by product model provider 35 to provide print product visualization services to print service providers 22.

As shown in FIG. 3A, user interface 200 includes display 202 and product descriptor module 214, according to one example of the present disclosure. In general terms, among other elements, display 202 displays a three-dimensional (3D) print product representation 210 to enable print service provider 22 to observe an appearance of a print product graphical representation before and after calibration.

In general terms, the product descriptor module 214 (operated by a print model provider 35) enables a print service provider 22 to produce highly accurate three-dimensional graphical representations of print products offered by the print service provider 22 to a buyer 30 and which are viewable via display 202. This accuracy enables buyers 30 to better visually understand the capabilities, quality, and output of particular print service providers 22. This capability, in turn, helps the print service provider 22 differentiate themselves from other print service providers 22 and increase the likelihood of a buyer 30 being satisfied with their purchase because the displayed sample will more closely match the actual product delivered to the buyer 30.

In one example, as shown in FIG. 3A, the product descriptor module 214 includes a three-dimensional (3D) geometric model function 220, a dimensional information function 230, and a modified model function 232. The 3D geometric model function 220 provides a geometric model of particular type of print product. In particular, each geometric model provides a general shape and overall size of a print product, along with an expression of the proportionality in size and shape of the different elements of the print product. In one example, the geometric model is expressed as a wire frame model, as previously noted. In this way, the model of the print product avoids unnecessary complexity while still accurately modeling the geometric properties and spatial relationships of a particular print product.

Accordingly, in one example, display 202 incorporates and/or cooperates with a rendering mechanism to generate an image from a model provided via 3D geometric model function 220. In one aspect, the rendering mechanism enhances and/or provides parameters such as lighting, shading, texture, viewpoint via a rendering equation to produce an image that provides a quality 3D visual representation of a print product.

Figures 4A, 4B, 5:
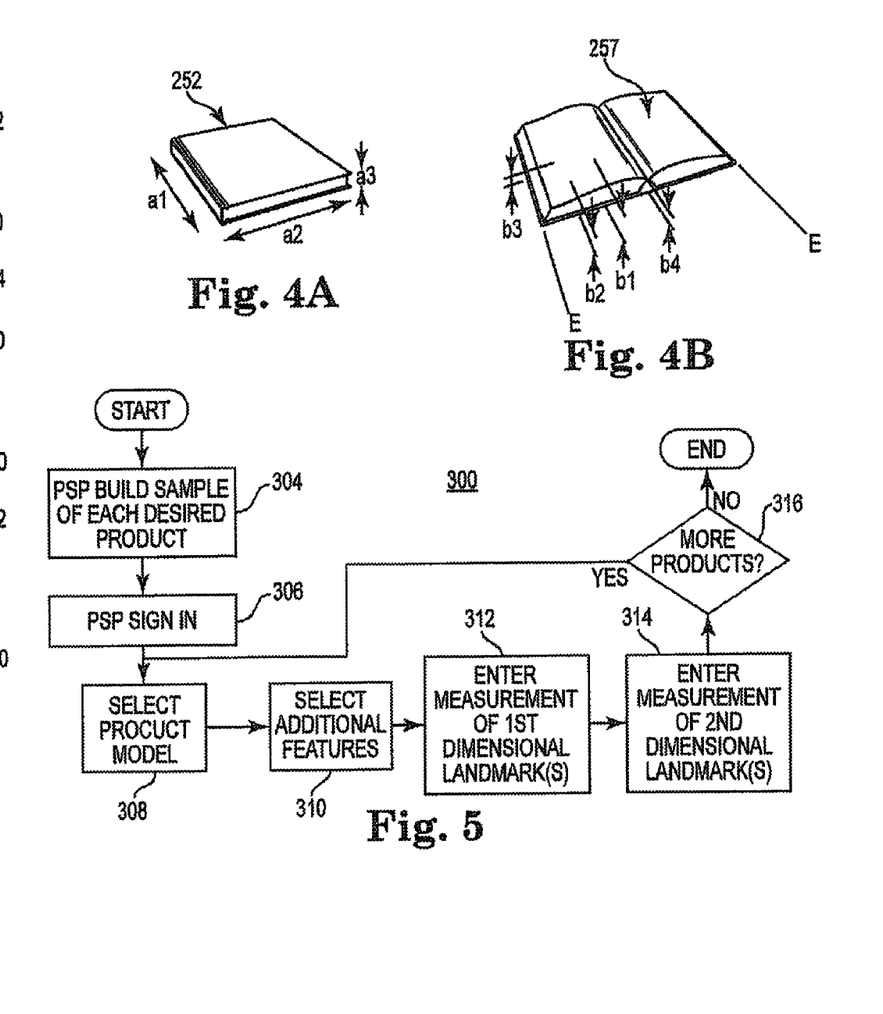
FIG. 4A is perspective view of a three-dimensional model of a print product in a closed state, according to an example of the present disclosure.
FIG. 4B is perspective view of a three-dimensional model of a print product in an open state, according to an example of the present disclosure.
FIG. 5 is a flow diagram of method of calibrating a print product model, according to an example of the present disclosure.

In one aspect, the 3D geometric model function 220 includes a dimensional parameter 222, which designates a single dimensional landmark or an array of designated landmarks of a particular 3D geometric model. In one example, as shown in FIG. 4A, dimensional parameter 222 provides three landmarks (a1, a2, and a3) regarding external aspects of a print product (e.g. a case bound book). In one aspect, landmark a1 corresponds to a length of a spine of book 252, while landmark a2 corresponds to a length of a bottom edge of book 252 and landmark a3 corresponds to a thickness adjacent a fore edge of book 252.

In another example, dimensional parameter 222 (FIG. 3A) captures information about geometric aspects of the print product when the print product is in a different state, such as an open state. Accordingly, as shown in FIG. 4B, in one example dimensional parameter 222 tracks four different landmarks (b1, b2, b3, and b4) of a book 257 in an open state. It will be understood that in some examples, the dimensional parameter 222 tracks a single landmark, while in other examples the dimensional parameter 222 tracks more than one landmark.

As shown in FIG. 4B, landmarks b1, b2, b3 extend from a center of a book outward toward an outer edge (E). Upon a print service provider 22 measuring a thickness at different portions of a book in an open state, these landmarks b1, b2, b3 capture the degree of pillowing and/or curvature of pages of print product 257. Together, the group of landmarks b1, b2, b3, and b4 enable a highly accurate calibration of a 3D graphical representation relative to an actual physical print product built by the print service provider 22, without having to resort to use of a complex model and/or complex modeling tool.

Further information regarding the dimensional landmarks designated by product model provider 35, and how a print service provider 22 employs them to achieve a high quality calibration, is further described later in association with at least FIG. 6.

As further shown in FIG. 3A, the product descriptor module 214 includes the dimensional information function 230 to receive input from the print service provider 22 regarding actual physical dimensions of a print product manufactured by the print service provider 22. Upon processing the submitted measurements, the display 202 (of user interface 200 operated by product model provider 35) depicts a modified model that reflects calibration according to the actual print product to be offered by print service provider 22. Further details regarding the interaction of print service provider 22 and product model provider 35 is later described in association with FIG. 5.

Figure 3B:
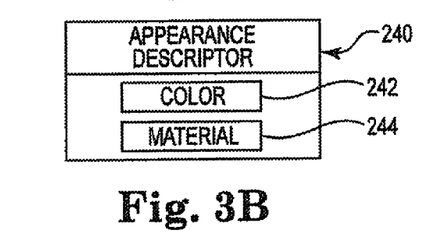
FIG. 3B is a block diagram schematically illustrating an appearance module, according to one example of the present disclosure.

With further reference to FIGS. 3A and 3B, in one example of the present disclosure, user interface 200 additionally includes an appearance descriptor module 240 while in other example, an appearance descriptor module 240 is deployed externally of user interface 200.

In general terms, appearance descriptor module 240 shown in FIG. 3B tracks non-geometric features and specifications associated with a print product and associated geometric models. For instance, these non-geometric features include color parameters 242 and material parameters 244. In one example, color parameters 242 include data expressing a color characterization of various elements of the print product, such as a specific printer, media, ink, varnish, etc. In one example, at least some of this data is embodied as meta information in a print file supplied by the buyer. In one aspect, this color characterization is expressed via an International Color Consortium (ICC) device profile. In one aspect, the ICC profile is specific for a particular type of printer, a specific media, and it contains information regarding how the color will look if different rendering intents for the color reproduction are used. However, in some examples, other color characterizations schemes are used.

In one example, materials parameter 244 includes data expressing the characterization of various materials and elements, such as the media, cover, ink etc., affecting the visual appearance (e.g. gloss, texture, translucency) of the print product. In one aspect, such characterization data expresses factors, include (but are not limited to) parameters of light reflection models, media grain, bi-directional reflectance distribution function (BRDF), etc.

In one aspect, the color parameter 242 and materials parameter 244 are employed independent of the geometric features addressed via product descriptor module 214 of FIG. 3A.

FIG. 5 is a flow diagram of a method 300 of calibrating a print product model, according to one example of the present disclosure. In particular, to take advantage of the product model services (provided via product model provider 35 in FIG. 1), the print service provider 22 first manufactures an instance of a print product, as shown in at 304 in FIG. 5. In one aspect, the blank print product includes no text or graphics or includes sample text or sample graphics (which is likely unrelated to the potential buyers content) but the blank print product otherwise exhibits all the geometric and spatial properties of the print product to be offered and produced for buyers. After connecting with a network site provided via product model provider 35 (at 306 in FIG. 5), the print service provider 22 then selects a corresponding print product from the library 37 of generic models (FIG. 1), as shown at 308, 310 in FIG. 5. After a model is selected that corresponds to the actual physical product (the blank sample) built by the print service provider 22, the print service provider 22 uses dimensional information function 230 (FIG. 3A) to provide dimensional information from the actual physical sample that correspond to the available dimensional landmarks of the geometric model, as shown at 312, 314 of FIG. 5. In one example, the dimensional information function 230 acts as a measurement function by which measurements are entered as discrete numerical values (e.g. 10 mm) corresponding to a physical measurement of a dimensional parameter of a respective one of the print products. In another example, the dimensional information function 230 cooperates with a slider function (such as slider function 425 described in association with FIG. 6) to receive measurement information based on a manipulation, by the print service provider, of a graphics tool relative to the dimensional parameter of a respective one of the print product models.

In one example, the actual physical print product is referred to as a print product artifact to reflect that a physical object is being described or identified.

In one aspect, with reference to at least blocks 312, 314 of FIG. 5 and product descriptor module 214 of FIG. 3A, product model provider 35 determines and sets the dimensional landmarks associated with each geometric model. In general terms, the dimensional landmarks set for any particular geometric model will correspond to a shape or aspect that is characteristic of the features of that type of print product. For example, most saddle-stitched booklets will exhibit pillowing, and therefore, at least one landmark provided via dimensional parameter 222 (FIG. 3A) for a saddle-stitched booklet would be positioned and oriented to express a degree of pillowing for a print product.

After print service provider 22 finishes submitting measurements for a particular model, the product model provider 35 will cause display of a modified model to be viewable and reviewed by print service provider 22, such as shown later in FIG. 6. As shown at block 316 in FIG. 5, if print service provider 22 is done adding products to its catalog, then method 300 terminates. However, if print service provider 22 desires to add more print product models to its catalog for access and/or viewing by buyers 30, then the method 300 proceeds to blocks 308, 310.

Accordingly, as illustrated via user interface 200 of FIG. 3A, via models 252, 257 of FIGS. 4A, 4B, and via method 300 of FIG. 5, for a given type of print product, the product descriptor module 214 reshapes or adjusts a geometric model according to measurement data (provided via print service provider 22) to produce a modified model. In this way, the modified model has been calibrated to geometric aspects of the three-dimensional representation of the print product. Upon combining the calibrated geometric aspects of the model with the data regarding the color parameter 242 and materials parameter 244 for a particular print product (such as a request from the buyer for a specific visual appearance, e.g. glossy with varnish and as specified by the PSP), and with the content of the print buyer provided (e.g. through a Print file 32 in FIG. 1) the three-dimensional representation 210 of the print product displayed on the print service provider's web site (to buyer) will provide a highly accurate visualization of the print product as it would be produced by the print service provider 22 for the buyer 30.

Figure 6:
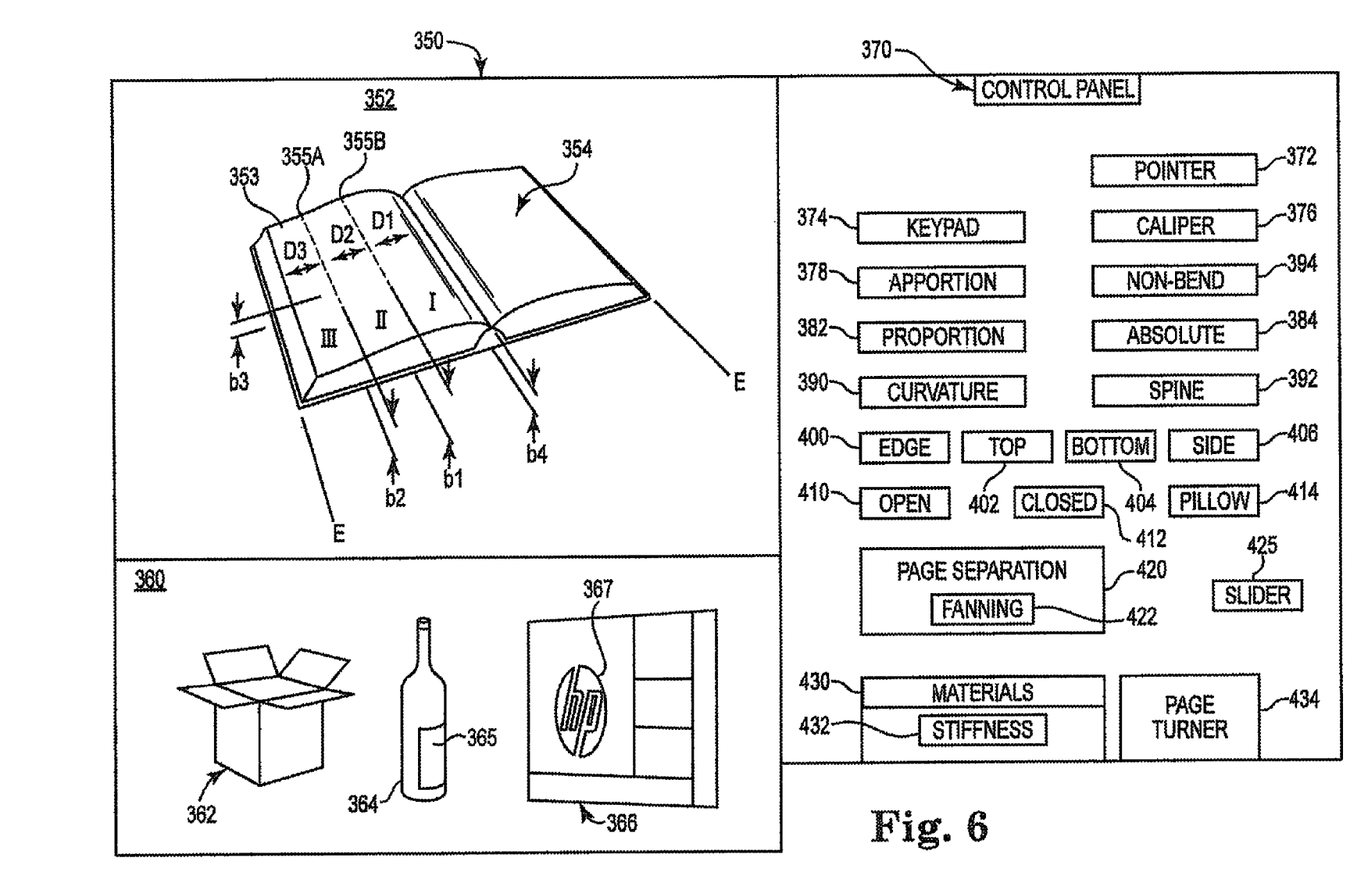
FIG. 6 is a diagram schematically illustrating a user interface accessible by a print service provider, according to an example of the present disclosure.

FIG. 6 is a diagram schematically illustrating a portion of a user interface 350 of a print product visualization system, according to an example of the present disclosure.

In one example, user interface 350 of FIG. 6 operates in cooperation with, and complements, at least user interface 200 in FIG. 3A. In another example, user interface 200 incorporates, in a complementary fashion, the functions, components, and modules of user interface 350. Accordingly, in one example, user interface 350 (including control panel portion 370) is stored in memory 144 of server 141 (FIG. 2A) and is executed, as machine readable instructions, via controller 142 of server 141.

As shown in FIG. 6, user interface 350 includes a control panel portion 370 and a display portion 352 depicting a three-dimensional geometric model of a print product, according to one example of the present disclosure. In one example, the display portion 352 depicts a visualization of a geometric model of the print product previously shown in FIG. 4B. However, it will be understood that display portion 352 can display any one of a wide variety of different print products and is not limited to displaying a model of the particular type, size, and shape of print product 354 shown in FIG. 6. Accordingly, as further shown in gallery portion 360 associated with display portion 352 and control panel portion 370, a print product model also can comprise other types of models, such as but not limited to, a container 362 (e.g. a box with or without closure flaps), a bottle 364 with label 365 (or other beverage container), or signage 366 with labeling 367. Accordingly, print product models, according to at least some examples of the present disclosure, are not strictly limited to books, pamphlets, magazines and the like.

In general terms, control panel portion 370 provides a print service provider 22 with a set of tools to calibrate a geometric model (provided by the product model provider 35) with control panel portion 370 working cooperatively and interactively with display portion 352. As shown in FIG. 6, in one example of the present disclosure, control panel portion 370 includes a pointer function 372, a keypad function 374, a caliper function 376, an apportion function 378, a non-bend parameter 394, a proportion function 382, an absolute function 384, a curvature function 390, a spine function 392, an edge function 400, a top function 402, a bottom function 404, a side function 406, an open state function 410, a closed state function 412, a pillowing function 414. It will be understood that in other examples, some of these functions are omitted and/or combined together into a single function.

In another example, control panel portion 370 includes a slider function 425, which is described later in more detail.

In one example, control panel portion 370 also includes a page separation function 420 including a fanning parameter 422, a materials function 430 including a stiffness parameter 432. In some embodiments, the materials function 430 includes other parameters regarding gloss, texture, and the like, which operate in a manner substantially the same as previously described in association with materials parameter 244 of appearance descriptor module of FIG. 3B. In some embodiments, control panel portion 370 also includes a color function that operates in a manner substantially the same as previously described in association with color parameter 242 of appearance descriptor module 240 of FIG. 3B.

FIGS. 7-12 depict various geometric models of print products and dimensional landmarks associated with each illustrated print product. Reference will be made to various aspects of these example print product models during the course of describing control panel portion 370 of user interface 350 shown in FIG. 6.

With further reference to FIG. 6, the various functions and parameters 372-434 of control panel portion 370 provide tools to designate dimensional landmarks relative to different portions of the print product 354 shown in display 352 and/or to manipulate measurements associated with dimensional landmarks of the print product. With this in mind, pointer function 372 enables a user to point to a particular portion of a print product and/or a particular measurement function regarding dimensional information, while keypad 372 enables entry of alphanumeric information for measurements or other data. In one example, caliper function 378 enables identifying a portion of a print product (e.g. a thickness, such as represented by landmark b1, b2, or b3) to which a measurement of a physical model can be applied.

In one example, as an alternative to or as a supplement to entering a measurement of a particular landmark (such as b1, b2, b3, b4 in FIG. 4B or FIG. 8) as discrete numerical value (e.g. 10 mm), the slider function 425 of control panel portion 370 enables making slidable adjustments (e.g. increases or decreases) in the dimensions of a particular landmark. To do so, the print service provider 22 engages the slider tool or function until the particular portion of the 3D geometric model (or 3D product representation) of the print product has the appearance (e.g. thicker, thinner, longer, shorter, etc.) that best corresponds to the appearance of the actual physical product. In one example, with further reference to print product model 354 in FIG. 6, the slider function 425 is used to increase or decrease the dimension of the print product model 354 at any one (or all) of the designated landmarks b1, b2, b3 without entering a discrete numerical value via dimensional information function 230 (FIG. 3A). Moreover, in one example, slider function 425 operates as a part of the graphical user interface of display 352 such that adjusting a dimension of a landmark via slider function 425 occurs simultaneous with a changed (and changing) appearance of the print product model 354 in display 352.

In another example, apportion function 378 enables designating landmarks via virtually apportioning a print product into multiple sections and/or to adjust the relative sizes of virtually apportioned sections. In one example, the apportion function 378 enable manipulation of the relative size of sections I, II, and III shown at page 353 of book 354 in FIG. 6 by slidable lateral movement of the borders 355A, 355B between the relative sections I, II, III. This apportionment adjusts the widths D1, D2, D3 of these sections. In one example, the apportionment function 378 operates in cooperation with slider function 425 to enable slidable manipulation of markers, such as borders 355A, 355B, which are associated with some landmarks, such as the widths D1, D2, D3.

In one example the apportion function 378 enables the user to fine-tune the exact location of various landmarks, such as a peak thickness of an open half of a book (such as at landmark b1 in FIG. 6), at which a measurement of their actual physical product was taken. Similarly, adjusting the location of another landmark b2 enables more accurately capturing the rate at which a thickness decreases from the peak thickness (landmark b1) in an orientation extending toward an outer edge (E) of the book.

Figure 7:
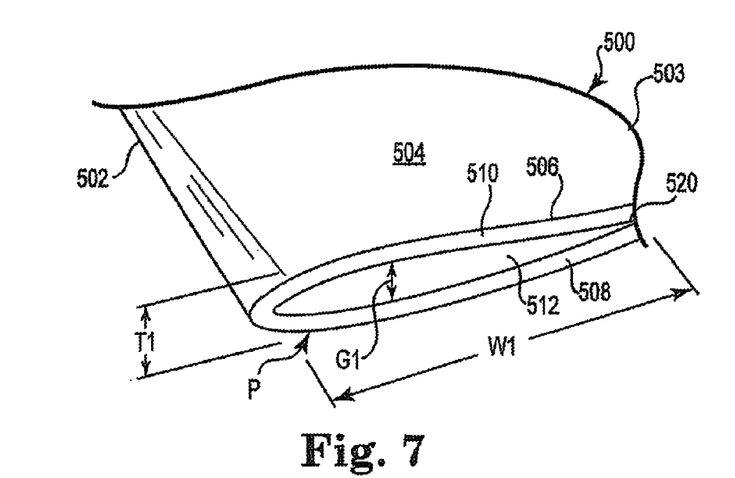
FIG. 7 is a partial perspective view schematically illustrating a saddle-stitched booklet, according to an example of the present disclosure.

As further shown in FIG. 6, control panel portion 370 includes a proportion function 382, an absolute function 384, and a pillow function 414, according to one example of the present disclosure. For illustrative purposes, these functions are described with reference to FIG. 7. FIG. 7 is a perspective view schematically illustrating a print product, such as a saddle-stitched booklet 500. The booklet 500 includes a spine 502, cover 504, and a bottom edge 506. As is common among saddle-stitched booklets in general, booklet 500 exhibits a pillowing region (P) in which booklet 500 has a larger thickness in a region adjacent to spine 502 as compared to outer edge 503 (where the two halves 508, 510 of the booklet lay flat against each other). This pillowing region (P) is quantifiable in several ways, one of which is a peak thickness (T1) and a gap (G1) between two halves 508, 510 of the booklet. In another aspect, the pillowing region (P) is further quantifiable according to a width (W1) over which the pillowing region (P) extends from the spine 502 toward the outer edge 503.

In one example, the gap (G1) and/or the peak thickness (T1) shown in FIG. 7 is designated as a landmark (by product model provider 35), at which a print service provider 22 takes measurements to calibrate a geometric model provided by product model provider 35.

In another aspect, proportion function 382 and/or absolute function 384 of control panel portion 370 also can be employed in connection with such measurements and establishing such dimensional landmarks. For example, the width (W1) of the pillowing region (P) shown in FIG. 7 is quantifiable as a measurement of absolute distance (such as x inches) via absolute function 384. However, in another example, the width (W1) of the pillowing region (P) is quantifiable as a relative amount via proportion function 382, such as the width (W1) being a percentage of the total width of the booklet 500 (from spine 502 to outer edge 503). In either case, applying measurements to such dimensional landmarks enables calibration of the geometric model according to an actual physical product, which in turn, enables providing a highly accurate visual 3D representation of product offerings available from the print service provider 22.

In one example, operation of the proportion function 382 and/or the absolute function 384 in control panel portion 370 is supplemented by use of the slider function 425 (as previously described above) to enable adjusting a dimension (associated with a landmark) via movement of a slider in display 352 instead of (or in addition to) entry of numerical values via dimensional information function 230 (FIG. 3A). Doing so enables immediate visualization of the adjustments in the appearance of the displayed print product model 354 as the adjustment is being made.

Figure 8:
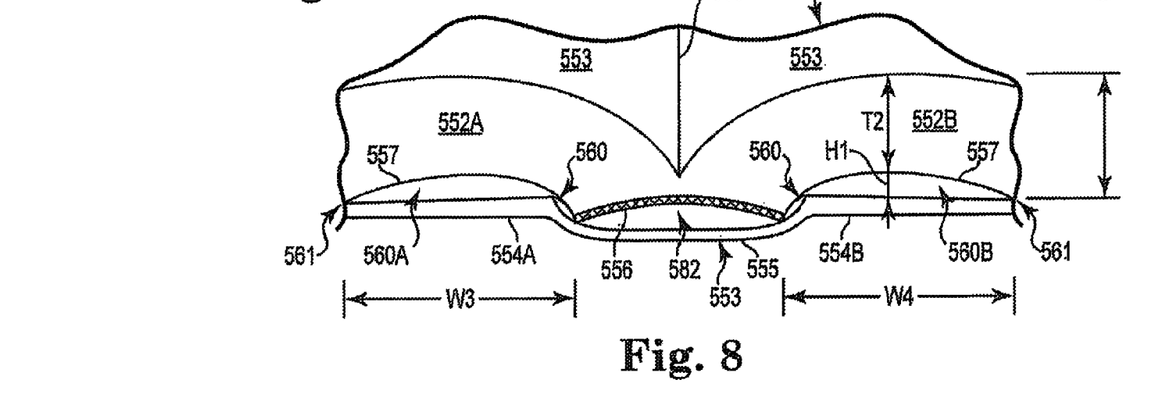
FIG. 8 is a partial front view schematically illustrating a case bound book, according to an example of the present disclosure.

With further reference to FIG. 6, in another aspect of control panel portion 370, the curvature function 390 also can be employed in connection with taking measurements and establishing dimensional landmarks. For example, FIG. 8 is front view schematically illustrating a case bound book 550 in an open state. As shown in FIG. 8, book 550 includes a set of pages 552A, 552B bound to a cover 553 via case-type binding 556. With book 550 lying on its spine 555 and in an open state, each page portion 552A, 552B extends over and onto cover portions 554A, 554B. Due to at least the case binding 556, number of pages, weight of page portions 552A, 552B, and stiffness of spine 582, a gap 560A, 560B is formed between the page portions 552A, 552B and their corresponding cover portions 554A, 554B. A maximum region of this gap 560A, 550B is identified as height (H1) and the thickness of the page portion above that "maximum gap region is identified as T2. Both H1 and T2 provide dimensional landmarks for a geometric model provided by a product model provider 35 and as measurement points for a print service provider 22.

In addition, the bottom portion 557 of each page portion 552A, 552B exhibits a page curvature that is tracked via curvature portion 390 as a dimensional landmark and measurement point. In some examples, as further shown in FIG. 8, another dimensional landmark (and measurement point) for the case bound book 550 is a width (W3, W4) from a junction 560 (between binding 556 and inner edge of a respective cover portion 554A, 554B) and a contact point 561 where page portion 552A, 552B makes contact against their respective cover portions 554A, 554B.

As a comparison, traditional techniques of accurately portraying the actual physical product built by the print service provider in a model would include building a mathematical model of the behavior of the curvature and pillowing of the books. Such mathematical models typically would involve mathematically constructing an extremely complex model of the type of thickness of glue used, temperature and humidity present during production, etc.

Figure 9:
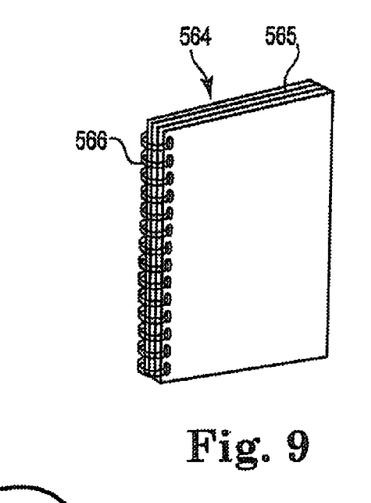
FIG. 9 is a perspective view schematically illustrating a coil bound print product, according to an example of the present disclosure.

With further reference to FIG. 6, control panel portion 370 also includes a spine function 392 that enables specifying a type of binding, such as case binding, perfect binding, coil binding, etc. and dimensional characteristics associated with the spine. With this capability in mind, FIG. 9 is a perspective view of a coil bound print product 564 having a group of pages or sheets and a coil binding 566, according to one example of the present disclosure. In one example, the spine function 392 specifies a dimensional landmark, such as a diameter of the coil of the coil binding 566 or the thickness of the wire defining the coil 566, both of which can be measured by the print service provider 22 (or supplied by the print service provider 22 when the data is already known).

Figures 10, 11:
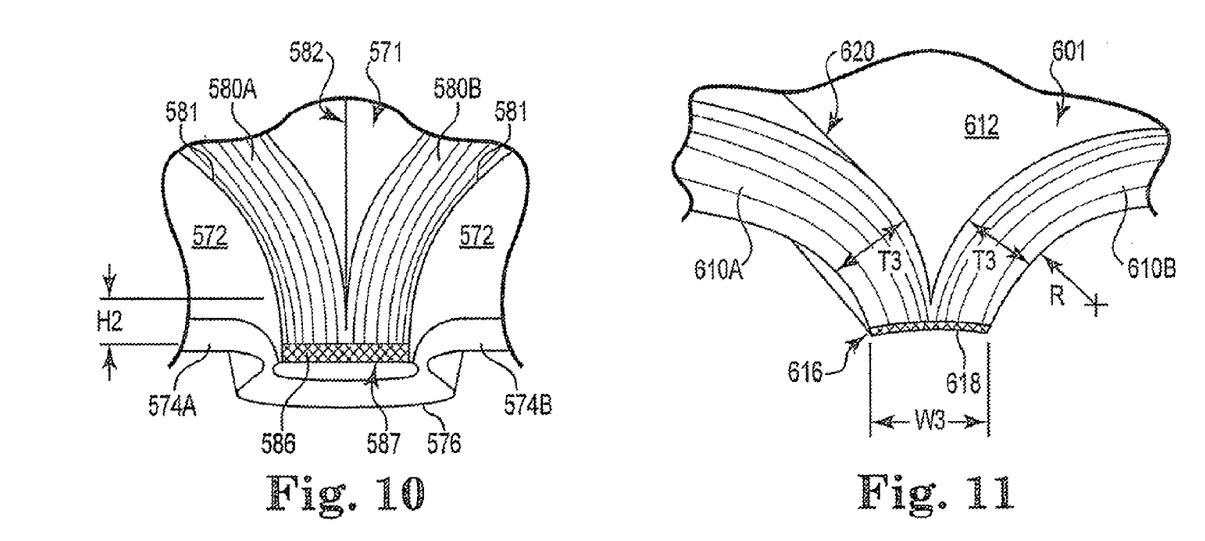
FIG. 10 is a partial front view schematically illustrating a case bound book, according to an example of the present disclosure.
FIG. 11 is a partial front view schematically illustrating a perfect bound book, according to an example of the present disclosure.

FIG. 10 is a front view of a case bound book 570, according to one example of the present disclosure, and which provides another example of application of the curvature function 390 of control panel portion 370 of FIG. 6. As shown in FIG. 10, case bound book 570 includes page portions 580A, 580B which are bound via case binding 586 relative to spine 576 and cover portions 574A, 574B. Due to the stiffness and materials of the binding 586, as well as the relative weight of pages in page portions 580A, 580B, the page portions 580A, 580B do not lay over on top of cover portions 574A, 574B to the same degree as in the example of a case bound book 550 in FIG. 8. Accordingly, one designated landmark for expressing the appearance of these factors via curvature function 390 is a radius of curvature of the bottom portion 581 of the page portions 580A, 580B. In addition, according to another example of the present disclosure, control panel portion 370 includes a non-bend parameter 394, which tracks the height (H2 shown in FIG. 10) by which page portions 580A, 580B extend vertically (when book 571 is in an open state lying on its spine) before beginning to bend over on themselves toward the respective cover portions 574A, 574B. In combination with curvature function 390, the non-bend parameter 394 is able to accurately express the appearance of some case bound books (or other types of bound print products) that have a relatively high stiffness originating from binding 586, spine 576, and page stiffness.

Another example of the deployment of curvature function 390 and/or spine function 392 of control panel portion 370 of FIG. 6 is provided in association with FIG. 11. FIG. 11 is a front view of a perfect bound book 601, according to one example of the present disclosure. As shown in FIG. 11, book 601 includes a spine 616 including a perfect-type binding 618 (tracked via spine function 392) and page portions 610A, 610B when book 601 is in an open state. As designated by product model provider 35, book 601 includes dimensional landmarks, such as a thickness (T3) of the page portions 610A, 610B, a width (W3) of spine 618 via spine function 392, and a radius of curvature R (tracked via curvature function 390).

Figure 12:
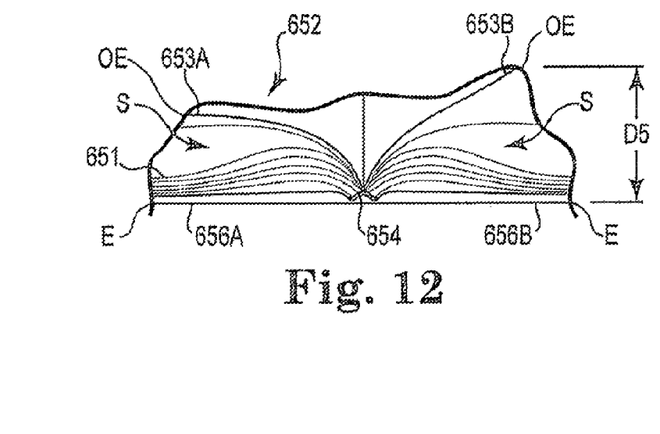
FIG. 12 is a front view schematically illustrating a case bound book, according to an example of the present disclosure.

In another example, control panel portion 370 of FIG. 6 includes a page separation function 420 with fanning parameter 422, which is demonstrated in association with at least FIG. 12. FIG. 12 is a front view schematically illustrating a case bound book 652 in an open state, according to an example of the present disclosure. As shown in FIG. 12, page portions 653A, 653B are bound via case-type binding 654 (with associated spine) and cover portions 656A, 656B. Based on at least the material properties of the case-type binding 654 and pages 651, the page portions 653A, 653B of book 652 exhibit a fanned appearance in which a significant degree of spacing (S) is present among the pages of each respective page portion 653A, 653B, whether in one spot or multiple areas.

With further reference to FIG. 6, the page separation function 420 of control panel portion 370 tracks the degree to which the pages are separated from each other via fanning parameter 422, according to one example of the present disclosure. As shown in FIG. 12, in one aspect, the degree of fanning associated with fanning parameter 422 (FIG. 6) is tracked via dimensional landmark (D5), which is a distance between outer edge (E) (of cover portions 656A, 656B) and an outer edge (OE) of a top page of the respective page portions 653A, 653B.

With further reference to FIG. 6, in one example control panel portion 370 includes an outer edge function 400, top edge function 402, a bottom edge function 404, and side edge function 406. These functions 400-406 enable custom measurements regarding particular features of a print product, which the print service provider 22 can use to increase the visualization accuracy beyond the dimensional landmarks designated by the print model provider 35.

As further shown in FIG. 6, in one example control panel portion 370 includes an open state function 410 and a closed state function 412. These functions 410, 412 enable the print service provider 22 to select whether the print product is viewed in a closed state, an open state, or both. In addition, these functions 410, 412 track whether measurements taken regarding a particular landmark or dimensional parameter are to be associated with the print product being in an open state or a closed state.

In one example, control panel portion 370 in FIG. 6 includes a materials function 430 with stiffness parameter 432, that enable adjusting the relative stiffness of portions of a print product model to achieve the appearance and behavior in a 3D representation that mimics the appearance and behavior of portions of an actual physical print product built by the print service provider 22.

In one example, control panel portion 370 includes a page turner function 434 to simulate the appearance of turning pages of the print product.

It will be understood that control panel portion 370 does not provide an exhaustive group of functions and parameters regarding all the possible dimensional landmarks that can be designated by a product model provider 35 and/or that can be measured by a print service provider. Rather, the functions and parameters illustrated in FIG. 6 merely provide examples of some of the types of dimensional landmarks designated by product model provider and for which print service provider takes measurements to calibrate a selected generic model for a print product.

Moreover, in another example, control panel portion 370 need not include all the functions, parameters, modules, and components illustrated in FIG. 6.

Figure 13:
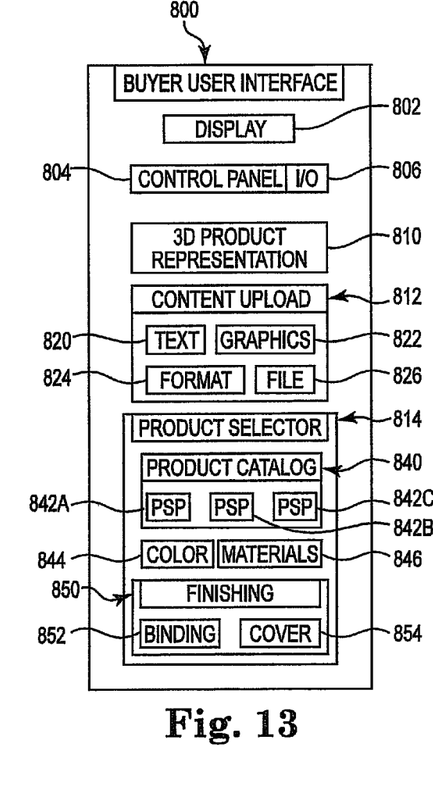
FIG. 13 is a diagram schematically illustrating a user interface accessible by a buyer, according to an example of the present disclosure.

FIG. 13 is a block diagram of a user interface 800 provided by a print service provider 22 and accessible by a buyer, according to an example of the present disclosure. In one example, user interface 800 comprises at least substantially the same features and attributes as user interface 180 as previously described in association with FIG. 2B.

As shown in FIG. 13, user interface 800 includes a display 802 and a control panel 804 with input/output function 806, a three-dimensional (3D) product representation 810, a content upload module 812, and a product selector module 814.

In one example, display 802 operates in a manner at least substantially similar to display 352 of FIG. 6 to display the 3D representation 810 (FIG. 13), except that display 802 visually depicts a print product (offered by print service provider 22) without landmark identifiers while control panel 802 enables buyer 30 to manipulate views and orientations of the 3D representation to fully appreciate the various features and aspects of the print product offering.

As further shown in FIG. 13, in one example the user interface 800 includes a content upload module 812. In general terms, the content upload module 812 enables a buyer 30 to upload their content to a print service provider 22 to allow visualization of how a print product would be produced by the print service provider 22, if authorized by the buyer 30. In one example, all the components of a print job or submission can be communicated by buyer 30 to print service provider 22 via a single print file or package via a file function 826, shown in FIG. 13. However, in other examples, the buyer 30 can separately submit text, graphics, and format specifications via a text function 820, a graphics function 822, and a format function 824, respectively, as shown in FIG. 13.

As further shown in FIG. 13, user interface 800 also includes product selector module 814, according to one example of the present disclosure. In general terms, the product selector module 814 enables the buyer 30 to select a desired print product available from a print service provider via a catalog of print products via product catalog function 840. In one aspect, print products in the catalog are supplied by different print service providers with each displayed print product including labeling that designates which print service provider is offering the particular print product. In this way, the buyer can directly compare the similarities and differences in appearance of a print product as prepared by different print service providers. However, in another aspect, the buyer 30 can view all the print products provided by a single print service provider by selecting one of the print service provider functions 842A, 842B, 842C that link the buyer with a catalog of just one print service provider.

In one example, as shown in FIG. 13, the product selector module 814 further includes a color parameter 844, a materials parameter 846, and a finishing function 850. In one aspect, the color parameter 844 enables the buyer e.g. to select the number of inks to be used on a digital press. For instance, one can choose from a set of CMYK inks versus a set of CMYKOV inks to affect a level of saturations in the reproductions while in other instances, one can choose between a set of CMYK inks versus a set of CMYKlclm (Cyan, Magenta, Yellow, Black, light cyan, light magenta) inks to affect the graininess. In other instances, one can choose between a set of CMYK inks versus a set of CMY inks plus spot color inks to affect an accuracy in reproduction of logo colors).

In another example, the material parameter 846 enables the buyer to request a specific visual appearance (e.g. glossy versus matte appearance) as well as to request a media with a specific texture and weight. In another aspect, any changes made in the respective color and material parameters 844, 846 are viewable in the 3D product representation 810 provided in display 802.

In another aspect, the finishing function 850 enables the buyer to identify and/or adjust finishing options, respectively, regarding their desired print product. Without limiting adjustment of other finishing specifications, the finishing function 850 includes binding parameter 852 and cover parameter 854 to implement adjustments to binding specifications and cover specifications. In one aspect, these adjustments are viewable in the 3D representation 810 provided in display 802.

Figure 14:
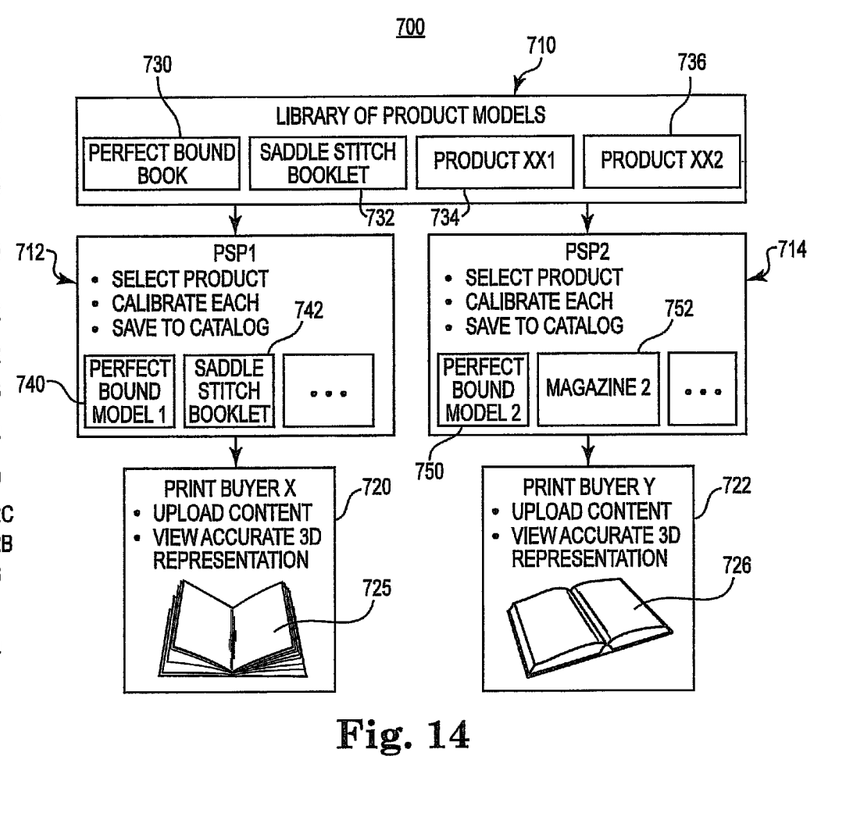
FIG. 14 is a diagram schematically illustrating a system and method of providing a three-dimensional graphical representation of a print product to a buyer, according to an example of the present disclosure.

FIG. 14 is a diagram schematically illustrating a system 700 of providing print services, according to an example of the present disclosure. This diagram acts as just one example of a summary of the various aspects of providing print services, according to general principles of the present disclosure. As shown in FIG. 14, system 700 includes a library 710 of three-dimensional geometric models of print products 730, 732, 734, 736, as would be provided by a product model provider 35 (FIG. 1). This library 710 is accessible by print service providers 712 (PSP1), 714 (PSP 2). In a manner substantially similar to that described in association with at least FIG. 5, each print service provider 712, 714 selects a product model, calibrates the product model relative to physical measurements (or available stored data of the print service provider) of an actual product, and then saves the calibrated print product model into a catalog maintained by the print service provider 712, 714. This process is repeated by the print service provider 712, 714 until the print service provider 712, 714 has developed a catalog of the desired quantity and range of print products. Each print service provider 712, 714 then displays a 3D representation 740, 742 (for provider 712) and 750, 752 (for provider 714) of their print product offerings.

Upon viewing these print product offerings, a print buyer 720, 722 selects a potential print product, uploads their content to the print service provider 712, 714, and then is able to view a 3D representation of the print product incorporating their content. In this way, the buyer is able to see an accurate rendering of what their print product would look like if produced by a particular print service provider. As an example, as shown in FIG. 14, print buyer 722 has selected a case bound book and is able to view their print product 726 in an open state.

Figure 15:
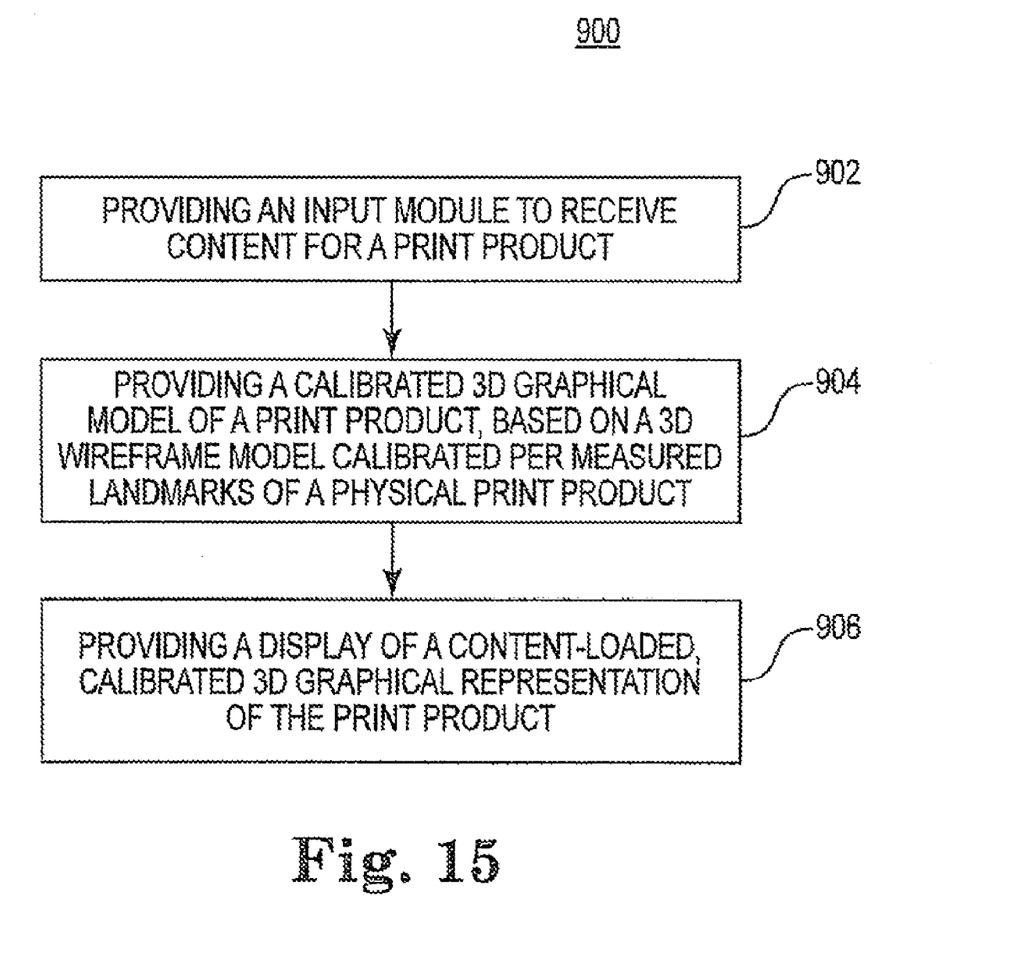
FIG. 15 is a flow diagram schematically illustrating a method of providing a print product display, according to an example of the present disclosure.

FIG. 15 is a flow diagram schematically illustrating a method 900 of providing a print product display, according to one example of the present disclosure. In one example, method 900 is performed according to at least some of the systems, components, modules, methods, interfaces that were previously described and illustrated in association with FIGS. 1-14. In another example, method 900 is performed according to other systems, components, modules, methods and interfaces.

As shown at 902 in FIG. 15, method 900 includes providing an input module to receive content for a print product. A blank, calibrated three-dimensional graphical model of a print product is provided and is based on a three-dimensional wireframe model that is calibrated according to measured landmarks of a physical print product, as shown at 904 in FIG. 15. In one aspect, the landmarks are designated by a product model provider and the measurements performed by a print service provider, who submits the measurements to the product model provider for calibration of the geometric model. As shown at 906, method 900 also includes providing a display of a content-loaded, calibrated three-dimensional graphical representation of the print product.

At least some examples of the present disclosure enable a print service provider to display, to a buyer, a highly accurate 3D representation of a print product after the print service provider calibrates a 3D geometric model (of the print product) supplied by a print model provider. In one example, information from an actual physical product (produced by the print service provider) is used to calibrate and adjust the 3D geometric model to increase the accuracy by which a 3D graphic representation (accessible by a buyer) advertises the capabilities of the print service provider. Accordingly, a print service provider is able to better differentiate themselves among their competition by providing more accurate 3D representations of how a buyer's product will appear if produced by that particular print service provider. This enhanced communication regarding the capabilities of the print service provider will likely increase buyer satisfaction as the final product will more closely correspond to the 3D representation viewed by the buyer.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein.

What is claimed is:

1. A print product user interface comprising:
a server including a non-volatile memory to store, and a processor to execute, machine readable instructions to provide:
a product descriptor module to provide access to a three-dimensional geometric model for a print product, to receive physical measurement information regarding at least one dimensional landmark of a physical print product artifact corresponding to the print product, and to calibrate the three-dimensional geometric model of the print product based on the physical measurement information, wherein the physical measurement information includes at least one measurement physically performed by a print service provider of a dimensional landmark of a first print product artifact physically produced by the print service provider, wherein the three-dimensional geometric model of the print product comprises a wireframe model; and
a display module to display a three-dimensional graphical representation of the print product based on at least the calibrated three-dimensional geometric model.

2. The user interface of claim 1, comprising:
an appearance module to automatically specify information regarding color properties and materials properties of the print product according to meta information, wherein the three-dimensional graphical representation of the print product is also based on the specified information.

3. The user interface of claim 1, comprising a catalog function to selectively cause storage of the calibrated three-dimensional geometric model in a memory and access to the stored calibrated three-dimensional geometric models.

4. The user interface of claim 1, wherein the physical measurement information is specified according to a dimensional parameter comprising at least one of:
a relative proportion dimensional parameter; and
an absolute dimensional parameter.

5. The user interface of claim 1, wherein the product descriptor module captures the physical measurement information via a measurement function to receive entry of a discrete numerical value.

6. The user interface of claim 1, wherein the user interface establishes a communication portal between a print service provider and a product model provider.

7. The user interface of claim 6, and further comprising a system that includes:
a second user interface to receive a content file from a buyer, to display the three dimensional graphical representation of the print product that embodies information from the content file, and to establish a communication portal between the print service provider and the buyer.

8. The user interface of claim 1, wherein the physical measurement information regarding the at least one dimensional landmark is specified according to a dimensional parameter comprising a pillowing dimensional parameter.

9. The user interface of claim 1, wherein the product descriptor module includes a slider function to receive the physical measurement information via a manipulation of a graphics tool relative to the at least one dimensional landmark of the print product.

10. The user interface of claim 1, wherein the physical measurement information regarding the at least one dimensional landmark is specified according to a dimensional parameter comprising at least one of:
a page curvature dimensional parameter;
a non-bend page portion dimensional parameter; and
a page separation dimensional parameter including a fanning parameter.

11. The print product user interface of claim 1, comprising:
a display screen to display the display module.

12. A print service system comprising:
a server including a non-volatile memory to store, and a processor to execute, machine readable instructions to provide for each print service provider of a plurality of print service providers:
an input module to receive a content file relating to a first print product;
an appearance descriptor module to specify color parameters and material parameters of the first print product;
a product descriptor module to provide a three-dimensional graphical model of the first print product, which has been calibrated based on at least one measurement physically performed by the respective print service provider of a dimensional landmark of a first print product artifact physically produced by the respective print service provider; and
a user interface, accessible by the buyer via a network communication link, to display a first three dimensional graphical representation of the first print product, available from each respective print service provider, based on at least the content file, the color parameters, the material parameters, and the calibrated first three-dimensional graphical model of the first print product for each respective print service provider,
wherein the system enables a comparison of the different, respective first three-dimensional graphical representations of the first print product from the respective print service providers relative to each other.

13. The print service system of claim 12, wherein each respective calibrated, first three-dimensional graphical model of the print product is generated, prior to the measurement, from a three-dimensional wireframe model of a print product provided by a product model provider.

14. The print service system of claim 13, wherein the user interface is selectively operable to display, for each respective print service provider, a catalog of selectable calibrated three-dimensional graphical representations, including the calibrated first three-dimensional graphical representation, wherein each calibrated three-dimensional graphical representation corresponds to a different print product and the first print product comprises one of the respective different print products.

15. The print service system of claim 12, wherein the print product includes at least one of a book and a box.

16. The print service system of claim 12, wherein the print product includes at least one of a beverage container and signage.

17. The print service system of claim 12, comprising:
a display screen on which the user interface is viewable.

18. A method of providing a print product display comprising:
providing a non-volatile memory to store, and a processor to execute, machine readable instructions to:
receive content, via an input module, for a print product;
calibrate a three-dimensional graphical model of a print product into which the content is loadable, wherein the graphical model is based on a three-dimensional wireframe model of the print product and the graphical model has been calibrated according to a physically measured landmark of a physical print product; and
display, at a network site, a content-loaded, calibrated three-dimensional graphical representation of the print product based on at least color parameters and the material parameters which are independent of the calibration landmarks.

19. The method of claim 18, wherein instructions to calibrate the three-dimensional graphical model comprise instructions to:
provide a library of uncalibrated, three-dimensional models of different print products;
receive a user selection of one of the uncalibrated, three-dimensional models;
receive the physically measured landmark of the physical print product that generally corresponds to the selected uncalibrated, three-dimensional graphical model;
provide stored access to a calibrated three dimensional graphical model of the print product; and
provide a catalog of calibrated three-dimensional graphical models of different print products that are viewable by a buyer and from which the buyer can select a print product for purchase.

20. The method of claim 18, wherein the measured landmark comprises at least one of:
a relative proportion landmark; and
an absolute landmark.

21. The method of claim 18, wherein the physically measured landmark comprises:
a pillowing landmark.

22. The method of claim 18, wherein the physically measured landmark comprises at least one of:
a page curvature landmark; and
a page separation landmark including a fanning parameter.

23. The method of claim 18, wherein the physically measured landmark of the physical print product corresponds to at least one measurement physically performed by the respective print service provider of a dimensional landmark of the physical print product, wherein the physical print product comprises a print product artifact physically produced by the respective print service provider.

* * * * *